Patented Aug. 6, 1940

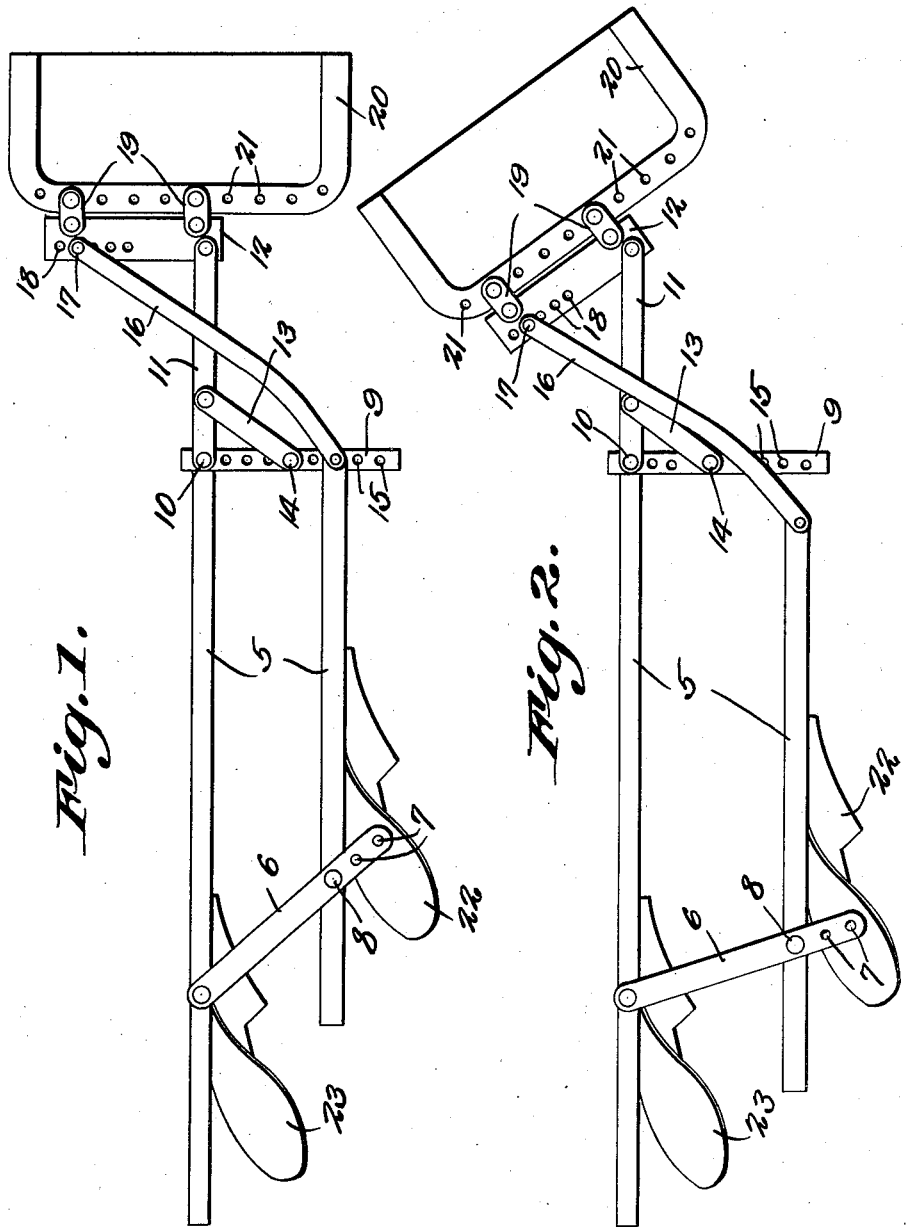

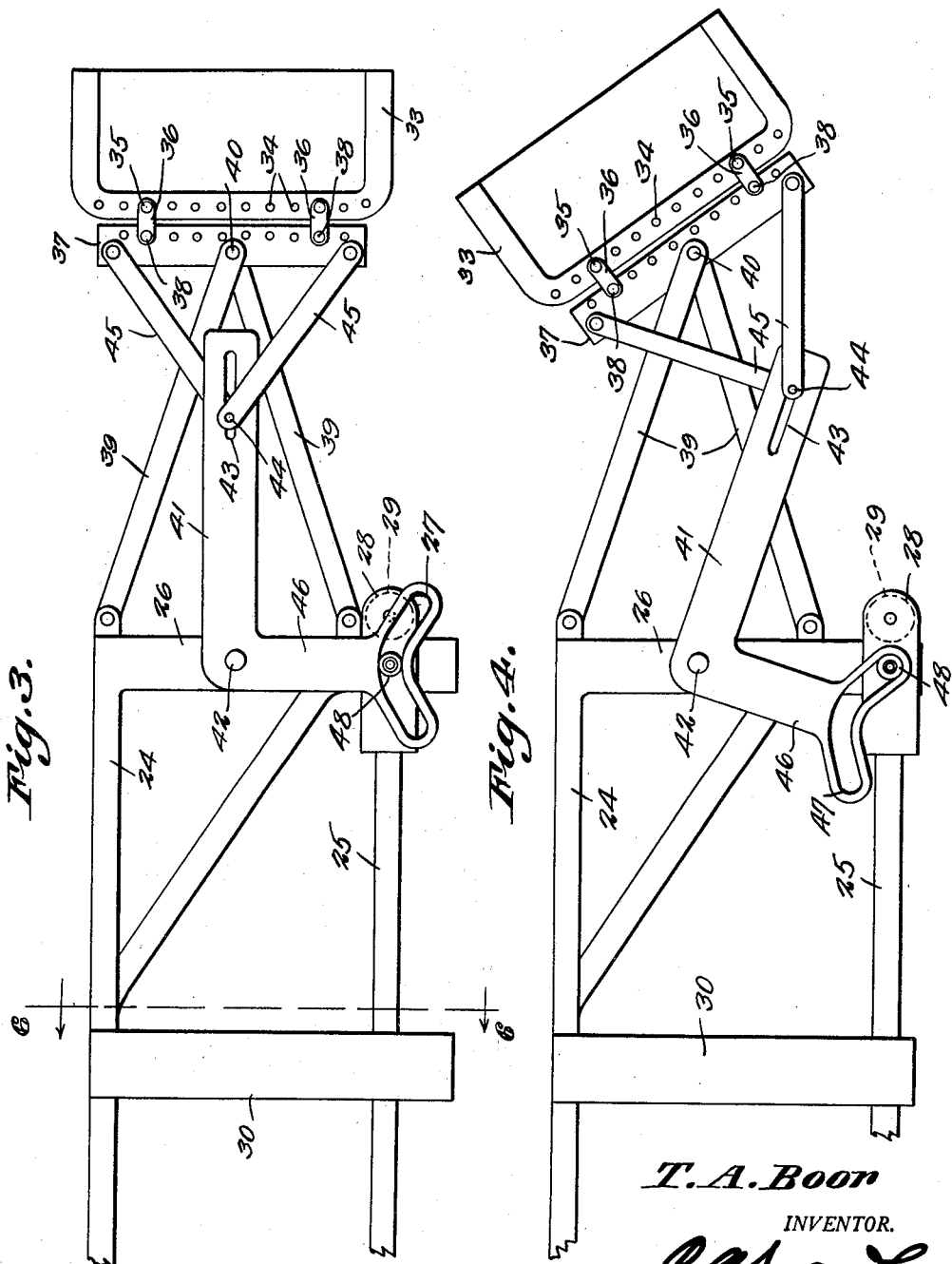

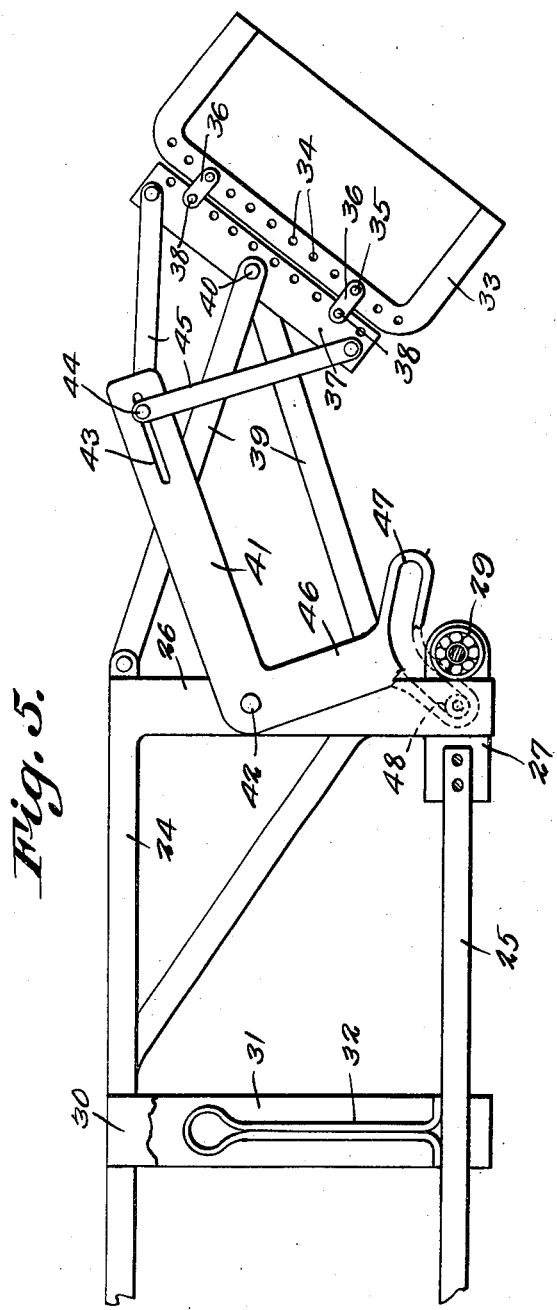
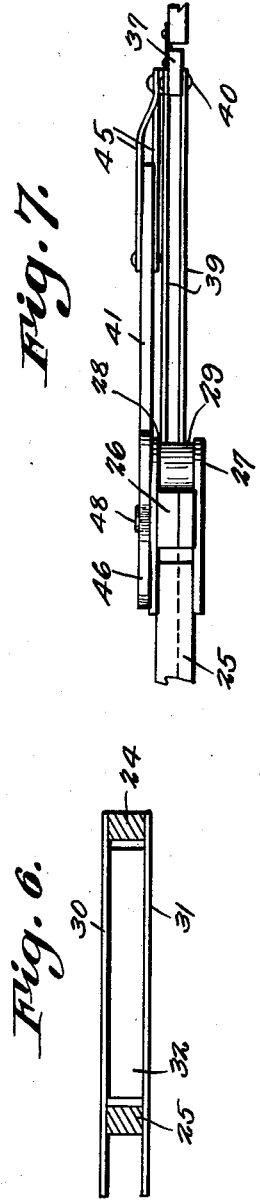

2,210,792

UNITED STATES PATENT OFFICE 2,210,792

PLOW

Theodore A. Boor, Ashville, Ohio

Application June 8, 1939, Serial No. 278,143

6 Claims. (Cl. 97—98)

This invention relates to plows and primarily the type of plows particularly adapted for mechanical traction.

The primary object of the invention is to provide a plow having laterally movable plow beams constructed and mounted in such a way that turning will be facilitated, and the plows will be expanded, reducing the extent of unplowed ground at headlands, and at the same time providing a plow which will form circular or curved corners at the ends of a field, eliminating the necessity of withdrawing the plow from the soil and resetting the plow at each turn of the plow.

An important object of the invention it to provide a draft appliance for plows embodying but few parts, and one which may be rearranged to permit the use of the device in connection with plows turning furrows either to the right or left.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a plow constructed in accordance with the invention.

Figure 2 is a plan view of the plow illustrating the positions of the plow beams when the tractor of the device is making a turn at one end of a field.

Figure 3 is a plan view of a modified form of the invention.

Figure 4 is a plan view illustrating the positions of the plow beams on making a left turn.

Figure 5 is a plan view of the plow construction as shown by Figure 4 of the drawings, illustrating the positions of the plow beams in making a right turn.

Figure 6 is a sectional view taken on line 6—6 of Figure 3.

Figure 7 is a fragmental side elevational view of the forward end of the device.

Referring to the drawings in detail, the reference character 5 designates parallel plow beams, which are pivotally connected at their rear ends and held in proper spaced relation with respect to each other, by means of the bar 6. This bar 6 is provided with a plurality of spaced openings 7 through which the securing bolt 8 may be extended in adjusting the normal positions of the plow beams 5, with respect to each other.

The forward end of one of the plow beams 5 is connected with the bar 9, as at 10, the connecting bolt between the plow beam 5 and bar 9 also passing through the bar 11, which has its forward end pivotally connected to the bar 12. A connecting link indicated at 13 connects the bar 11 with the bar 9, and is provided with a bolt 14 that passes through openings 15 in the bar 9, so that an adjustment of the bar 9 with respect to the plow beams, may be made.

Pivotally connected with the forward end of the plow beam 5, or the shorter plow beam, is a bar 16 that has its forward end pivotally connected with the bar 12, by means of the bolt 17, which passes through the openings 18 of the bar 12, so that an adjustment of the bar 16 with respect to the bar 12 may be made. Substantially short connecting links 19 connect the bar 12 with the rear end of the tractor frame, indicated at 20, the tractor frame being provided with a plurality of spaced openings 21 so that the links 19 may be adjusted to meet various requirements.

From the foregoing it will be seen that due to the construction shown and described, the plow beams 5 will remain in their normal spaced relation with respect to each other, as the plow is being moved over a field. When the tractor turns at the end of the field, it is obvious that this turning movement of the tractor will move the bar 16 outwardly, causing the beams 5 to separate, allowing the outermost plow, indicated at 22 to swing outwardly away from the adjacent plow 23, greatly reducing the extent of unplowed ground at the end of the field, and known as headlands.

In the form of the invention as shown by sheet 2 of the drawings, the reference character 24 designates a plow beam which operates in parallel spaced relation with the plow beam 25. As clearly shown by Figure 3 of the drawings, the forward end of the plow beam 24 extends at right angles as at 26 where it moves between the plates 27 and 28, which are bolted or otherwise secured to the plow beam 25. Mounted between the plates 27 and 28 and disposed adjacent to the outer ends thereof, is a roller 29 which is preferably of the ball bearing type, the roller acting as a bearing for the right angled end 26 of the plow beam 24.

Secured to the plow beam 24, at a point in spaced relation with respect to the right angled end 26 of the beam 24, are upper and lower bars 30 and 31, between which the plow beam 25 moves. Secured to the inner surface of the plow beam 25 is an arm 32 which is adapted to move with the beam 24, the free end of the arm 32 adapted to engage the inner surface of the plow beam 24, when the plow beam 25 moves inwardly, thereby restricting inward movement of the plow beam 25.

In this form of the invention, the traction device is indicated by the reference character 33, and is provided with a plurality of openings 34 disposed in the rear bar of the frame of the traction device, the openings 34 being designed to receive bolts 35 that connect the plates 36 to the traction device.

These plates 36 overlap the bar 37, and are bolted to bar 37 at 38. A plurality of openings are also formed in the bar 37, so that adjustments between the traction device and bar 37, may be readily made.

Links 39 have pivotal connection with the right angled end 26 of the plow beam 24 and have their forward ends pivotally connected to the bar 37, at a point intermediate the ends of the bar, as at 40. Thus it will be seen that through these links 39, power is applied to the plow beams, to move the device over the ground surface.

The reference character 41 indicates the operating lever which is in the form of a bell crank, the operating lever being pivotally connected to the right angled end 26 of the plow beam 24, at 42 the operating lever 41 being provided with an elongated opening 43 through which the bolt 44 extends. This bolt 44 also extends through the adjacent ends of the links 45 that have pivotal connection with the bar 37, adjacent to the ends of the bar 37, as clearly shown by the drawings. The free end of the arm 46, forming a part of the operating lever 41, is elongated and curved, the elongated portion of the arm 46 being formed with an opening 47 in which the roller 48 moves, the roller 48 being carried by the plate 28, mounted at the forward end of the plow beam 25. Thus it will be seen that as the operating lever 41 is pivoted, and the roller 48 moves through the opening, the plow beam 25 will be moved towards and away from the plow beam 24. It will of course be understood that the plow beams 24 and 25 support plow blades.

From the foregoing it will be seen that when the traction device is moving in a straight line, the plow beams 24 and 25 will take positions as shown by Figure 3 of the drawings. Should the traction device turn to the left as shown by Figure 4, the movement of the operating lever will be such that the roller 48 will move to one end of the elongated opening of the arm 46, moving the plow beam 25 laterally in a direction away from the plow beam 24. This movement of the plow beam 25 will permit the plows to move in the arc of a circle at the end of a field, eliminating the necessity of pulling the plows from the ground and resetting the plows in making the turn.

It will be obvious that the operating lever 41 will move in the opposite direction, when the traction device is turned to the right, accomplishing the spreading apart of the plow beams so that the plows carried thereby may move in the arc of a circle.

What is claimed is:

1. In a plow, a pair of spaced pivotally connected parallel plow beams, plows on the plow beams, means for hitching the plow beams to a traction device, said means including pivoted bars connected with the plow beams, and said pivoted bars adapted to spread the plow beams apart when the traction device turns in rounding a corner.

2. In a plow, a pair of spaced pivotally connected parallel plow beams, plows on the plow beams, means for hitching the plow beams to a traction device, said means comprising a pair of bars pivotally connected with the plow beams, said bars crossing each other, a plate connected with the traction device and to which the bars are connected, and said bars adapted to move to spread the plow beams as the traction device turns with respect to the plow beams.

3. In a plow, a pair of spaced pivotally connected parallel plow beams, plows on the plow beams, means for hitching the plow beams to a traction device, said means including pivoted arms connected with the plow beams and traction device, an operating bar pivotally connected with one of the plow beams, a bar pivotally connected with the adjacent plow beam and having adjustable connection with the operating bar means for transmitting turning movement of the traction device to the operating bar whereby the plow beams are moved towards and away from each other.

4. In a plow, a pair of spaced pivotally connected parallel plow beams, plows on the plow beams, means for hitching the plow beams to a traction device, said means including an operating lever pivotally connected with one of said plow beams and having a right angled end formed with an elongated curved opening, a roller carried by the adjacent plow beams and operating in the opening, and means for transmitting turning movement of the traction device to the operating lever whereby one of said plow beams is moved towards or away from the adjacent plow beam.

5. In a plow, a pair of spaced parallel plow beams, plows on the plow beams, means for hitching the plow beams to a traction device, said means including an operating lever in the form of a bell crank lever, pivotally connected to one of said plow beams, said operating lever having an elongated curved opening, a roller carried by one of said plow beams and moving in said elongated curved opening, means for transmitting movement of the traction device to the operating lever swinging the operating lever laterally whereby one of said plow beams is moved towards or away from the adjacent plow beam.

6. In a plow, a pair of spaced pivotally connected parallel plow beams, plows on the plow beams, means for hitching the plow beams to a traction device, one end of one of said plow beams extending at right angles, guide plates on the adjacent plow beams between which the right angled end of the first mentioned plow beam moves, a bell crank lever pivotally connected to the right angled end of said plow beam, said bell crank lever having an elongated curved opening formed at one end thereof, a roller secured to one of said plow beams and operating in said opening, and means for transmitting turning movement of the traction device to the bell crank lever, whereby one of said plow beams is moved towards and away from the adjacent plow beam.

THEODORE A. BOOR.